Patented Nov. 13, 1951

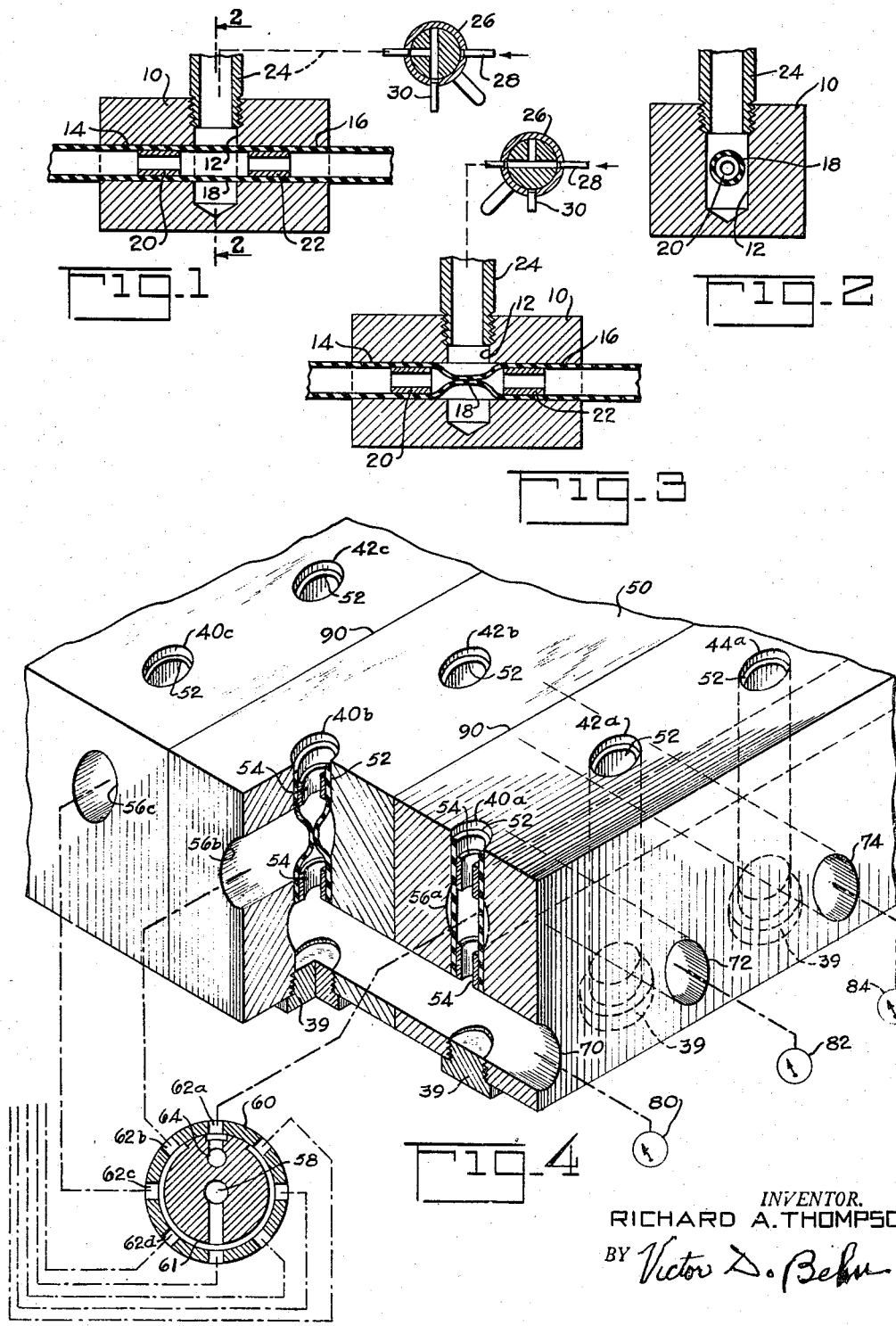

2,575,240

UNITED STATES PATENT OFFICE 2,575,240

VALVE CONSTRUCTION

Richard A. Thompson, West Caldwell, N. J., assignor to Wright Aeronautical Corporation, a corporation of New York Application September 30, 1948, Serial No. 51,911

3 Claims. (Cl. 137—144)

This invention relates to valves and is particularly directed to a remotely operable valve construction together with a novel application of said valve.

An object of the present invention comprises the provision of a novel valve which can be readily operated from a remote point. Specifically the valve of the present invention comprises a tube of rubber-like material which is arranged to convey the fluid to be controlled by said valve. Means are provided for applying a fluid under pressure externally of said tube for at least partially collapsing said tube.

Although the novel valve of the present invention is of general application, a further object of the invention is directed to the provision of a novel measuring system utilizing a plurality of said valves, whereby a large number of pressures can be successively measured in groups by a relatively small number of instruments.

Other objects of the invention will become apparent upon reading the annexed detailed description in connection with the drawing in which:

Figure 1 is an axial sectional view through a valve embodying the invention;

Figure 2 is a sectional view taken along line 2—2 of Figure 1;

Figure 3 is a view similar to Figure 1 with the valve in its closed position; and Figure 4 illustrates an application of the valve illustrated in Figures 1 to 3 to a novel measuring system.

Referring to Figures 1 to 3 of the drawing, a valve body 10, of metallic or other rigid material, is provided with a bore or chamber 12 formed therein. The valve body 10 is also provided with first and second aligned passageways 14 and 16 opening into said chamber from opposite sides. A tube 18 of rubber-like material extends across said chamber 12 and into said passageways, said tube forming a passage for the fluid to be controlled by the valve 10 from some remote point. A pair of sleeves 20 and 22 of relatively rigid material are provided, the one sleeve 20 securely anchoring and sealing a portion of the tube 18 against the walls of the passage 14 and the other sleeve 22 securely anchoring and sealing another portion of the tube 18 against the walls of the passage 16. The fluid to be controlled is arranged to flow through the tube 18. Said fluid may be supplied to and from the valve body passageways 14 and 16 by suitable conduits or as illustrated the tube 18 itself may project from the valve body 10 for conveying said fluid to and from said valve.

The diameter of the bore or chamber 12 is preferably larger than that of the tube 18, as best seen in Figure 2, so that any fluid under pressure supplied to said chamber 12 acts against the entire external surface of said tube in said chamber. The sleeves 20 and 22 compress the rubber-like material of the tube 18 against the walls of passageways 14 and 16 whereby the tube 18 itself provides a fluid tight seal for the chamber 12. By supplying a fluid under sufficient pressure to the chamber 12 the portion of the tube 18 within said chamber can be partially or completely collapsed (as illustrated in Figure 3) depending on the magnitude of said fluid pressure. The pressure required to completely collapse or close the tube 18 depends on the stiffness of the rubber tube 18 and the pressure inside said tube.

Obviously, the chamber 12 need not be larger than that of the tube 18 since, as long as the chamber 12 communicates with a portion of the external surface of the tube 18, said tube can be collapsed by applying sufficient pressure to the chamber 12.

A conduit 24 communicates with the chamber 12 and with a valve 26 disposed at some remote point. In its position illustrated in Figure 3, the valve 26 is open and connects a source of fluid under pressure in a supply line 28 to the conduit 24 and chamber 12. In its position of Figure 1, the valve 26 closes or shuts off said fluid pressure and connects a drain passage 30 to said conduit 24 and chamber 12.

With this construction, by opening the valve 26 fluid under pressure is admitted to the valve chamber 12 to at least partially collapse the tube 18 to an extent dependent on the magnitude of said pressure thereby at least partially closing the valve 10. If its tube 18 is completely collapsed, as illustrated in Figure 3, the valve 10 is completely closed. When the valve 26 is moved back to its closed position of Figure 1, the fluid pressure is cut off from the conduit 24 and chamber 12 and instead said conduit and chamber are vented through a drain passage 30 whereupon the flexible rubber-like tube 18 returns to its normally tubular condition to open the valve 10 thereby permitting fluid flow therethrough. This construction provides a relatively simple arrangement for controlling the valve 10 from the remote point at which the valve 26 is disposed.

Each sleeve 20 and 22 produces compression within the adjacent wall of the rubber-like tube 18 thereby securely anchoring and sealing the tube 18 to the walls of the passageways 14 and 16. For this purpose, the free external diameter of the tube 18 is preferably slightly larger than the internal diameter of the passageways 14 and 16 and the free internal diameter of said tube is preferably slightly smaller than the external diameter of the sleeves 20 and 22. For example, in a valve 10 in which the passages 14 and 16 have an internal diameter of 0.266 inch it has been found satisfactory to make the sleeves 20 and 22 0.375 inch long with an external diameter of 0.188 inch and the tube 18 is provided with a free internal diameter of 0.183 inch and a free external diameter of 0.295 inch. By "free diameter" of the tube 18 is meant its diameter when no external forces are applied thereto. The sleeve 20 and 22 and the rubber-like tube 18 may be assembled within the passageways 14 and 16 by first axially stretching said tube to reduce the thickness of its wall.

The purpose of the sleeves 20 and 22 is to place the adjacent portions of the tube 18 in compression against the walls of the passageways 14 and 16 so as to provide a seal therebetween to prevent leakage from the chamber 12. Accordingly, the invention is not limited to the aforedescribed diametrical dimensions or even to the relative magnitudes of said dimensions. In fact, the tube 18 may be held in sealing engagement with the walls of the passageways 14 and 16 in any suitable manner.

Referring now to Figure 4, there is illustrated an application of the aforedescribed remotely controllable valve to a measuring system in which a plurality of pressures can be measured and/or controlled in groups. The pressures to be measured are connected to one end of a plurality of inlet passages 40a, 42a, 44a etc.; a plurality of inlet passages 40b, 42b, etc.; and so forth, in a valve block 50, the other ends of the said inlet passages being closed by suitable plugs 39. The passages 40a, 42a, etc. are hereinafter referred to as the a group, the passages 40b, 42b, etc. are hereinafter referred to as the b group, and so forth. The number of said groups of passages and the number of passages in each group can obviously be varied as desired. A valve similar to the valve 10 of Figures 1 to 3 is provided in each of said passages, each said valve comprising a tube 52 of rubber-like material secured in said passages by sleeves 54. In addition, bores 56a, 56b, etc., having a diameter larger than that of said passages, extend across the tubes 52 of the a, b, c, etc. groups of passages, respectively, to provide a chamber preferably surrounding each tube 52, to which bores a fluid under pressure can be selectively supplied as hereinafter described.

The valve block 50 is also provided with a plurality of outlet passages 70, 72, 74, etc., to which pressure responsive measuring instruments 80, 82, 84, etc., are connected. The passage 70 communicates with the outlet end of each tube 52 disposed in the passages 40a, 40b, 40c, etc., whereby said outlet passage 70 is arranged to communicate one at a time with the passages 40a, 40b, 40c, etc., depending on which one of their valves is open. Similarly the passage 72 is arranged to communicate one at a time with the passages 42a, 42b, 42c, etc., and so forth. The number of outlet passages 70, 72, 74, etc., is equal to the number of inlet passages in each of the a, b, c, etc. groups.

A source of fluid under pressure is connected to a supply passage 58 in a valve 60 which is arranged to selectively connect said source of pressure to all but one of the bores 56a, 56b, etc. For this purpose, the valve 60 is provided with a groove 61 which is adapted to connect its inlet supply passage 58 to all but one of its outlet ports 62a, 62b, 62c, etc. In addition, the valve 60 is provided with a drain passage 64 which is arranged to be selectively connected to its said outlet ports. As illustrated in Figure 4, the drain passage 64 is connected to the valve outlet port 62a and the bore 56a whereby the tubes 52 in the a group of passages are all open. The outlet ports 62b, 62c, etc., and their associated bores 56b, 56c, etc., are all connected to the source of fluid pressure 58. The source of fluid pressure 58 is sufficiently large that the rubber-like tubes 52 in the b, c, etc. groups of passages are all completely collapsed or closed thereby. Accordingly, with the valve 60 in the position illustrated, the passages 40a, 42a, 44a, etc., are open to the outlet passages 70, 72, 74, etc., respectively, while the b, c, etc. groups of passages are closed to said outlet passages whereby the pressure in said a group of passages can be measured by the instruments 80, 82, 84, etc. connected to said outlet passages. When it is desired to measure the pressures communicated to the b group of passages, the valve 60 is rotated so as to bring the drain passage 64 into communication with the valve port 62b. In this way, a large number of pressures can be successively measured in groups (the a, b, c, etc. groups) by the relatively small number of measuring instruments 80, 82, 84, etc.

The block 50 may comprise a one-piece construction or, as indicated by the lines 90, it may comprise a plurality of sections, one for each of the groups of pressures to be measured. The sections of the block 50 are bolted or otherwise secured together with suitable sealing gaskets disposed therebetween. With this sectional construction, additional groups of pressures can readily be added to the system for measurement, without any increase in the number of measuring instruments 80, 82, etc. merely by adding extra sections to the block 50 with the pressure connections thereto.

While I have described my invention in detail in its present preferred embodiment, it will be obvious to those skilled in the art, after understanding my invention, that various changes and modifications may be made therein, without departing from the spirit or scope thereof. I aim in the appended claims to cover all such modifications.

I claim as my invention:

1. A system for measuring a first group of fluid pressures and a second group of fluid pressures; said system comprising a first plurality of passageways for said first group of fluid pressures; a second group of passageways for said second group of fluid pressures; a plurality of tubes of rubber-like material, each forming at least a portion of one of said passageways, respectively; inlet passages, each communicating with the exterior of the rubber tubes of each group of passageways; outlet passages, each communicating with one passageway of each group; and means communicating with said inlet passages for selectively applying a pressure fluid to said inlet passages to compress the corresponding tubes.

2. A system for measuring a pair of fluid pressures; said system comprising a first pair of passageways, one for each of said fluid pressures; a pair of tubes of rubber-like material, one for each of said passageways and connected at one end to its respective passageway; a second pair of passageways, one for each of said rubber-like tubes and having one end disposed externally of and adjacent to its associated rubber-like tube; means for selectively applying a fluid pressure to said second pair of passageways for closing its associated rubber-like tube; and an outlet passageway connected to the other ends of both said tubes for selectively receiving said pair of fluid pressures to be measured.

3. A system for measuring a first group of fluid pressures and a second group of fluid pressures; said system comprising a first group of passageways, one for each of the fluid pressures of said first group; a second group of passageways, one for each of the fluid pressures of said second group; a plurality of tubes of rubber-like material, one for each of said passageways and connected at one end to its respective passageway; a pair of passageways, one for each of said first and second groups of passageways and communicating with the exterior of the rubber-like tubes connected to the passageways of its respective group of said first and second groups of passageways; means for selectively applying a fluid pressure to said pair of passageways for closing their associated rubber-like tubes; and a group of outlet passageways, each of said outlet passageways being connected both to the other end of one of the rubber-like tubes of a passageway of said first group and to the other end of one of the rubber-like tubes of a passageway of said second group for selectively receiving said first and second groups of fluid pressures to be measured.

RICHARD A. THOMPSON.

REFERENCES CITED

The following references are of record in the file of this patent:

UNITED STATES PATENTS

| Number | Name | Date |
|---|---|---|
| 1,284,465 | Ryan | Nov. 12, 1918 |
| 2,069,261 | Monnet | Feb. 2, 1937 |
| 2,297,026 | Sanford | Sept. 29, 1942 |
| 2,457,655 | Gifford | Dec. 28, 1948 |